United States Patent Office 3,355,592
Patented Nov. 28, 1967

3,355,592
MONITORING DEVICES INDICATING SPACING
BETWEEN ARTICLES MOVING IN A STREAM
Douglas William Ballantyne Muir, London, England,
assignor to The Molins Organisation Limited, a corporation of Great Britain
Filed May 22, 1964, Ser. No. 369,445
Claims priority, application Great Britain, May 23, 1963,
20,644/63
5 Claims. (Cl. 250—224)

ABSTRACT OF THE DISCLOSURE

A control system monitors spacing between articles moving in a stream such as cigarettes by means of a light ray and an A.C. amplifier coupled to a photodetector to pass only A.C. signals representative of detected signal pulses produced when the light ray is interrupted by flow of said articles. The duty cycle of said pulses is held within predetermined limits to feed the articles in the stream at proper speed.

---

This invention relates to monitoring devices for use in connection with machines which deliver articles in a continuous stream at high speed. With such machines, it is almost invariably desirable to provide for quick and automatic detection of any form of fault which leads to stoppage of the stream as otherwise many articles and possibly parts of the machine itself may be damaged due to accumulation of articles at the position of the stoppage.

A good example of a type of machine to which devices embodying the invention may be applied is a continuous-rod cigarette-making machine, which may operate at speeds of the order of 2000 cigarettes per minute, so that in the event of stoppage large accumulations of cigarettes rapidly appear, and as cigarettes are somewhat fragile the accumulated cigarettes are usually damaged. In the following description the invention will be described with reference to its use in association with such cigarette-making machines, it being understood however that the invention is not limited to such use.

According to the invention, there is provided a monitoring device for use in checking spacing between successive articles in a continuous stream along a defined path, comprising means for projecting a light beam or the like across said path to photo-electric detector means on the far side of said path, said detector means being adapted to deliver an electrical output of predetermined amplitude whenever the beam is received without interruption by a passing article, and A.C. circuit means arranged to receive such output pulses and deliver a control signal whenever the average value of said pulses over a period lies within a preselected range.

It will be understood that in such a device, the duration of each pulse will be equal to the time taken for a gap between successive articles to pass the position at which the beam crosses the path (conveniently termed the scanning position). As the pulses are of predetermined amplitude, the average value thereof over a period represents the ratio of the total length of the gaps passing the scanning position during that period to the total length of gaps and articles passing in the same period. If an article remains stationary at the scanning position no output pulses are delivered by the detector means, while if no articles pass so that the beam is uninterrupted, the detector means produces a steady D.C. output but no pulses. In neither case does the A.C. circuit means respond and no control signal is produced. The said control signal is preferably so applied to any machine with which the device is used that the machine ceases to operate in the absence of the control signal, so that if the stream of articles stops or the gaps between articles become too short or too long in relation to the length of the articles, any of which conditions indicate faulty machine operation, then the machine is stopped to avoid possible damage to articles and/or the machine.

Preferably the A.C. circuit means comprises an A.C. coupled amplifier followed by an integrating circuit, and it is generally desirable to equip this circuit means with voltage stabilised operating power supplies. Conveniently the control signal is produced as a D.C. voltage applied to the coil of a relay, and contacts of the relay may then be connected to control an associated machine.

In order that the invention may be well understood, a preferred embodiment thereof will now be described with reference to the accompanying drawings, in which.

Figure 1:
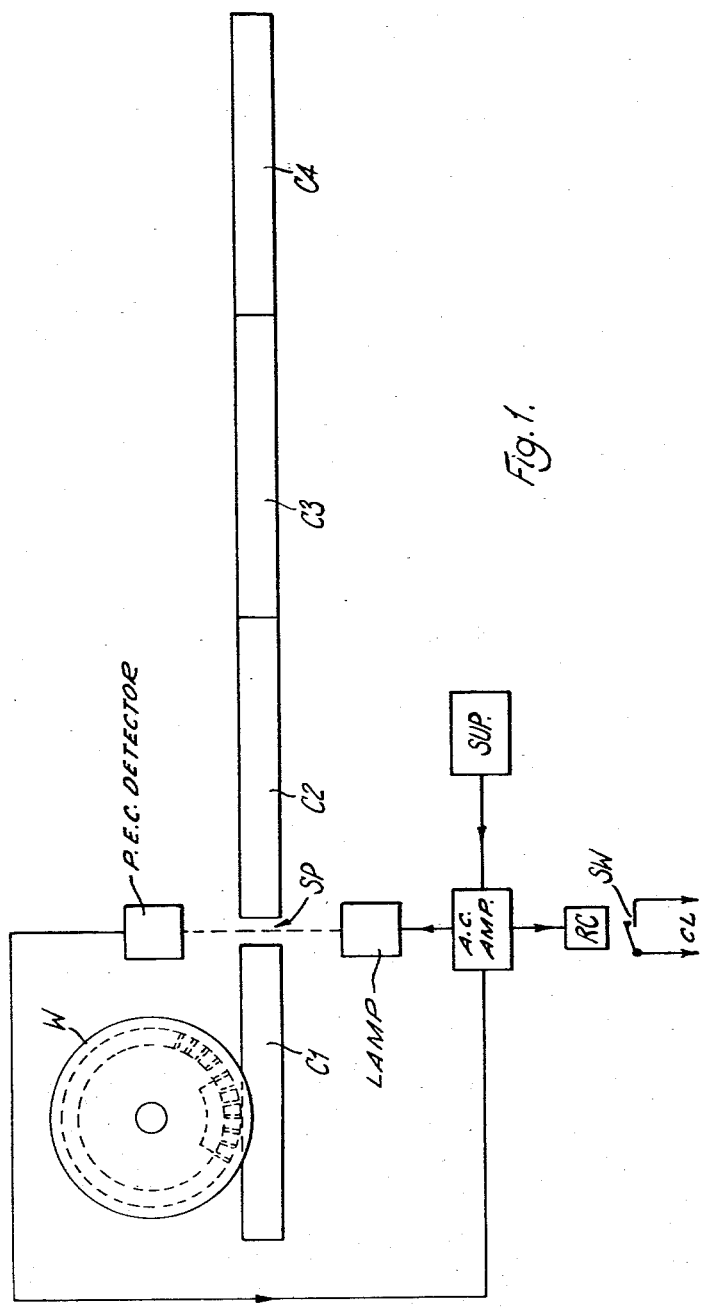
FIGURE 1 is a schematic block diagram of a device embodying the invention.

The device to be described is intended for use with a continuous-rod cigarette-making machine and in FIGURE 1 there is schematically indicated a stream of cigarettes $C_1$, $C_2$, $C_3$, $C_4$ found near the output end of such a machine, and a suction wheel W forming a part of said machine. The operation of such a machine is in general not material to the present description, and all that need be said is that the cigarettes approach the wheel W as a continuous stream, each cigarette engaging the preceding and succeeding one (see cigarettes $C_2$–$C_4$); the wheel W has a peripheral speed greater than the linear speed of the cigarettes and as each cigarette is engaged by the wheel W it is pressed against wheel W by atmospheric pressure, because wheel W has apertures in its periphery through which air is sucked by a suction pump (not shown); each cigarette is therefore abruptly accelerated to travel at the speed of the periphery of wheel W and as a result a gap appears between that cigarette and the succeeding one—as illustrated by the gap shown in FIGURE 1 between cigarette $C_1$ which is engaged with wheel W and the succeeding cigarette $C_2$.

Accordingly, when the machine is operating correctly, at any position in the path of the cigarettes within one cigarette length of the point at which they engage the wheel W there will be gaps between successive cigarettes and if the length of these gaps is not correct this is an indication of faulty operation.

A point within one cigarette length in advance of the wheel, identified by reference SP, is established as a scanning position by placing a lamphouse and a detector unit on either side of the path of the cigarettes. The lamphouse contains a lamp and conventional optical components so as to project a well-defined light beam across said path to the detector unit, which latter contains a photo-electric cell.

The lamp and photo-electric cell are both connected to an amplifier unit, whose operating power supplies are derived from a stabilised power supply unit SUP; control signals produced in the amplifier unit are delivered to a coil RC of a relay having contacts SW connected by control leads CL to a control circuit (not shown) of the cigarette-making machine.

Figure 2:
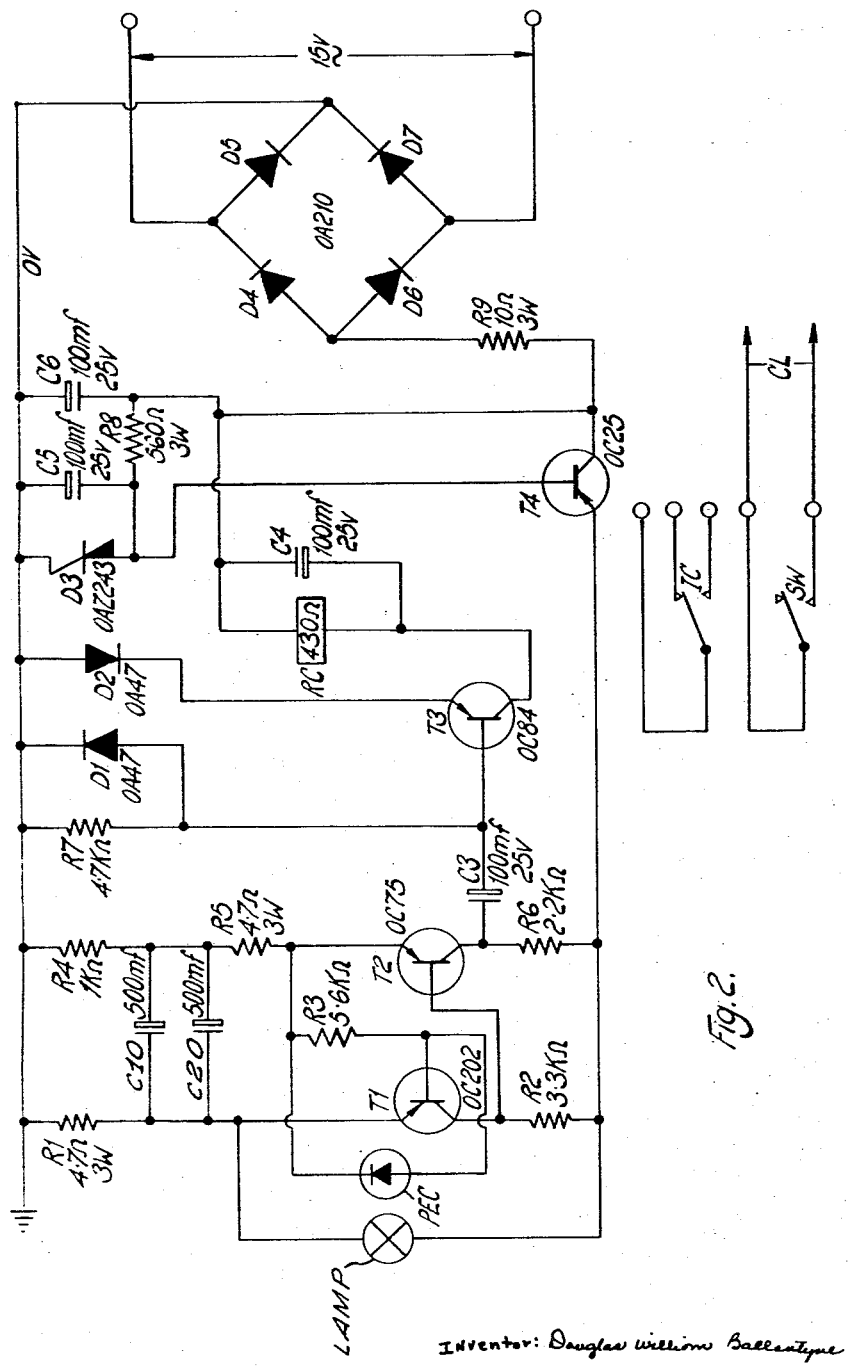
FIGURE 2 is a circuit diagram of the device of FIGURE 1.

The electrical circuits are shown in detail in FIGURE 2. The power supply unit will be readily identified in the right-hand portion of the figure, it comprises a bridge rectifier circuit including four diodes D4–D7, and a smoothing network of resistor R8 and capacitors C5, C6. A semi-conductor diode D3 serves to apply the output voltage of the smoothing network to a transistor T4 through which current delivered by the unit must pass, stabilising the output of the unit in known manner.

The amplifier appears in the left-hand part of the figure and comprises three stages, containing transistors $T_1$, $T_2$ and $T_3$ respectively. The lamp contained in the lamphouse is indicated by reference LAMP, and the photoelectric cell contained in detector unit by reference PEC, and the lamp, the photo-electric cell, and transistors $T_1$, $T_2$ of the first and second stages all receive power from the supply unit via a common decoupling network of resistors $R_1$, $R_4$, and capacitors $C_{10}$, $C_{20}$. Output pulses from the cell PEC (arising whenever a gap between cigarettes passes the scanning position SP and allows the beam of light from lamphouse to reach the cell PEC in detector unit) are applied to an input resistor $R_3$ connected between base and emitter of transistor $T_1$ and amplified pulses across a load resistor $R_2$ in the collector circuit of transistor $T_1$, are applied between base and emitter of transistor $T_2$. The base circuit of transistor $T_1$ and emitter of transistor $T_2$ are connected to the decoupling network via a common resistor $R_5$ providing a negative feedback connection to stabilise the first stage of the amplifier and reduce unwanted noise originating in said first stage.

From transistor $T_2$, an output is taken across load resistor $R_6$ in the collector circuit to the base of transistor $T_3$ via a capacitor $C_3$, this interstage coupling therefore confining the amplifier as a whole to dealing with A.C. signals so that sustained illumination of the cell PEC will not give any ultimate amplified output. As the pulses to be handled are all of one polarity, a leakage network of resistor $R_7$ and diode $D_1$ is provided to avoid the generation of unwanted dynamic bias at the base of transistor $T_3$. A diode $D_2$ serves to provide required emitter bias for transistor $T_3$, and the collector circuit of this transistor contains the relay coil RC as its load; in shunt with said relay coil a capacitor $C_4$ is connected so that the output circuit of the third stage of the amplifier integrates amplified output pulses, i.e. the voltage maintained across the coil RC will represent the average value of the pulses received over a period.

So long as cigarettes pass the scanning position with correct spacing, pulses of corresponding duration will be delivered by the photo-electric cell to the amplifier, and after amplification will be delivered to the relay coil RC shunted by capacitor $C_4$ and a sufficient voltage will be maintained across coil RC to hold closed contacts SW of the relay. If no gaps or gaps of insufficient length are present between successive cigarettes, or indeed if (which is unlikely) the gaps are correct but the cigarettes are of excessive length, then the pulses will not appear, will be of unduly short duration, or will be excessively separated in time respectively and in any of these cases the average value-representing voltage across the relay coil RC will drop and the contacts SW permitted to open. Conversely, if no cigarettes pass the scanning position for a time then the photo-electric cell will produce a steady D.C. output which will affect the condition of the first two stages of the amplifier, as these stages have D.C. couplings, but will not affect the third stage on account of the A.C. (capacitative) coupling between transistors $T_2$, $T_3$; this condition will produce no voltage across the relay coil RC, while excessively long gaps between successive cigarettes will also produce a condition of low mean voltage across said coil and in either case contacts SW will open.

For accuracy, it is noted that some small voltage may always be applied to relay coil RC, as in the absence of pulses from transistor $T_3$ the third stage transistor $T_3$ may draw some small current in its collector circuit but transistor $T_3$ is so biased that this standing current is sufficiently small for its presence to be ignored.

Lastly it will be noted that the relay has a further set of contacts, identified by reference IC (FIGURE 2), which are shown as changeover contacts and are not essential to the operation described but may be used for ancillary purposes, e.g. as indicator contacts switching a power supply to energise, say, a green indicator lamp when the relay is operated and a red indicator lamp when the relay is released, corresponding to satisfactory and unsatisfactory operation of the cigarette-making machine.

While the above description and accompanying drawings disclose a device embodying the invention in some detail, it will be appreciated that various changes or modifications may be made in the device without departing from the scope of the invention, for example, other types of amplifier circuit may be utilised.

What I claim as my invention and desire to secure by Letters Patent is:

1. A monitoring device for use in checking spacing between successive articles in a continuous stream along a defined path, comprising, in combination, means located on one side of said path for projecting a beam of radiation across said path, radiation-sensitive detector means arranged on the other side of said path to receive said beam, and A.C. circuit means connected to receive an electrical output from said detector means, said beam and said detector means being placed at a single station along said stream so that the beam is interrupted by articles passing in said stream thereby to deliver an electrical output pulse whenever said beam is received at a gap between two successive passing articles, so as to produce a succession of electrical pulses of uniform amplitude but of duration dependent upon the lengths of gaps between successive articles, and said A.C. circuit means comprises direct current blocking means sensitive to the average amplitude value over a period of time of said succession of output pulses for limiting transmission of a control signal to such times as the average amplitude value is within a preselected range.

2. A device as claimed in claim 1, in which the A.C. circuit means consisting of an A.C. coupled amplifier followed by an integrating circuit.

3. A device as claimed in claim 1, in which the A.C. circuit means is equipped with voltage stabilised operating power supplies.

4. A device as claimed in claim 1, in which the A.C. circuit means includes an arrangement producing a D.C. control voltage only when said pulses are in said range and a relay coupled for operation by said D.C. voltage.

5. A device as claimed in claim 1, including means located adjacent said station for engaging said articles in said stream and accelerating said articles from said stream to thereby develop said gaps between successive articles in the path of said beam.

References Cited
UNITED STATES PATENTS

| | | | |
|---|---|---|---|
| 2,351,229 | 6/1944 | Potts | 250—219 |
| 2,451,816 | 10/1948 | Dunn | 250—219 |
| 2,896,636 | 7/1959 | Powell et al. | 198—232 |
| 3,311,224 | 3/1967 | King | 250—223 |

RALPH G. NILSON, *Primary Examiner.*

J. D. WALL, *Assistant Examiner.*